(12) United States Patent
Tobari et al.

(10) Patent No.: US 10,177,357 B2
(45) Date of Patent: Jan. 8, 2019

(54) METHOD FOR PRODUCING POROUS POLYIMIDE FILM

(71) Applicant: Tokyo Ohka Kogyo Co., Ltd., Kanagawa (JP)

(72) Inventors: Mitsuharu Tobari, Kanagawa (JP); Yoshitsugu Kawamura, Kanagawa (JP); Kaoru Ishikawa, Kanagawa (JP); Tsukasa Sugawara, Kanagawa (JP)

(73) Assignee: TOKYO OHKA KOGYO CO., LTD., Kanagawa (JP)

( * ) Notice: Subject to any disclaimer, the term of this patent is extended or adjusted under 35 U.S.C. 154(b) by 0 days.

(21) Appl. No.: 15/509,247

(22) PCT Filed: Sep. 7, 2015

(86) PCT No.: PCT/JP2015/075366
§ 371 (c)(1),
(2) Date: Mar. 7, 2017

(87) PCT Pub. No.: WO2016/039299
PCT Pub. Date: Mar. 17, 2016

(65) Prior Publication Data
US 2017/0256766 A1 Sep. 7, 2017

(30) Foreign Application Priority Data
Sep. 10, 2014 (JP) .............................. 2014-184387

(51) Int. Cl.
| | |
|---|---|
| *B01D 67/00* | (2006.01) |
| *B01D 71/64* | (2006.01) |
| *H01M 2/14* | (2006.01) |
| *C08G 73/10* | (2006.01) |
| *H01M 2/16* | (2006.01) |
| *B01D 69/02* | (2006.01) |
| *B01D 69/12* | (2006.01) |
| *B32B 27/28* | (2006.01) |
| *B32B 27/34* | (2006.01) |
| *H01M 10/05* | (2010.01) |
| *H01M 8/103* | (2016.01) |

(52) U.S. Cl.
CPC .......... *H01M 2/145* (2013.01); *B01D 67/003* (2013.01); *B01D 67/0006* (2013.01); *B01D 67/0009* (2013.01); *B01D 67/0023* (2013.01); *B01D 69/02* (2013.01); *B01D 69/12* (2013.01); *B01D 71/64* (2013.01); *B32B 27/28* (2013.01); *B32B 27/34* (2013.01); *C08G 73/10* (2013.01); *H01M 2/16* (2013.01); *H01M 2/1653* (2013.01); *H01M 8/103* (2013.01); *H01M 10/05* (2013.01); *B01D 2323/12* (2013.01); *B01D 2325/021* (2013.01); *B32B 2307/20* (2013.01); *B32B 2457/10* (2013.01)

(58) Field of Classification Search
CPC ............ B01D 67/0006; B01D 67/0009; B01D 6/0023; B01D 67/003; B01D 71/64
See application file for complete search history.

(56) References Cited

U.S. PATENT DOCUMENTS

| | | |
|---|---|---|
| 6,426,372 B1 | 7/2002 | Minami et al. |
| 2003/0148112 A1 | 8/2003 | Kawashima et al. |
| 2010/0048745 A1 | 2/2010 | Yamada et al. |
| 2011/0159362 A1* | 6/2011 | Wakizaki ................ H01G 9/02 429/209 |
| 2012/0207999 A1 | 8/2012 | Ohya et al. |

FOREIGN PATENT DOCUMENTS

| | | |
|---|---|---|
| JP | 62-177039 | 8/1987 |
| JP | 2000-44719 | 2/2000 |
| JP | 2002-43743 | 2/2002 |
| JP | 2003-200525 | 7/2003 |
| JP | 2003-313356 | 11/2003 |
| JP | 2007-211136 | 8/2007 |
| JP | 2009-73124 | 4/2009 |
| JP | 2012-107144 | 6/2012 |
| JP | 2012-167181 | 9/2012 |
| WO | 2008/114798 | 9/2008 |
| WO | 2011/043467 | 4/2011 |

OTHER PUBLICATIONS

International Search Report dated Dec. 1, 2015 in International (PCT) Application No. PCT/JP2015/075366.

* cited by examiner

*Primary Examiner* — Kara B Boyle
(74) *Attorney, Agent, or Firm* — Wenderoth, Lind & Ponack, L.L.P.

(57) ABSTRACT

Provided is a method for producing a porous polyimide film with which it is possible to suppress the occurrence of curling in the polyimide-fine particle composite film obtained by firing the unfired composite film. The method for producing a porous polyimide film of the present invention includes, in the following order: forming an unfired composite film using a varnish that contains a resin including polyamide acid and/or polyimide, fine particles, and a solvent; immersing the unfired composite film in a solvent including water; firing the unfired composite film to obtain a polyimide-fine particle composite film; and removing the fine particles from the polyimide-fine particle composite film.

9 Claims, No Drawings

METHOD FOR PRODUCING POROUS POLYIMIDE FILM

TECHNICAL FIELD

The present invention relates to a method for producing a porous polyimide film.

BACKGROUND ART

In recent years, porous polyimide has been researched as a separator of a lithium-ion battery, a fuel cell electrolyte film, a film for separating a gas or liquid, or a low dielectric constant material.

For example, well-known are a method for making porous by using a specific mixture solvent for a polyamide acid solution, a method for making porous by subjecting polyamide acid including a hydrophilic polymer to thermal imidization, followed by removing the hydrophilic polymer, and a method for making porous by removing silica from polyimide containing silica particles, and the like (see Patent Documents 1 to 3).

Patent Document 1: Japanese Unexamined Patent Application, Publication No. 2007-211136
Patent Document 2: Japanese Unexamined Patent Application, Publication No. 2000-044719
Patent Document 1: Japanese Unexamined Patent Application, Publication No. 2012-107144

DISCLOSURE OF THE INVENTION

Problems to be Solved by the Invention

Among them, the method for making porous by removing silica from polyimide containing silica particles is an effective method capable of producing a homogeneous and dense porous polyimide film. In the production method, it is necessary to form an unfired composite film containing polyamide acid and silica particles by using a varnish containing polyamide acid and silica particles and fire the unfired composite film so as to obtain a polyimide-fine particle composite film.

The present inventors have studied and found that when the formed unfired composite film is fired as it is, curling occurs in the resulting polyimide-fine particle composite film. Such curling remains even after fine particles are removed, and it is difficult to remove such curling.

The present invention has been made in view of such conventional circumstances, and an object of the present invention is to provide a method for producing a porous polyimide film with which it is possible to suppress the occurrence of curling in the polyimide-fine particle composite film obtained by firing the unfired composite film.

Means for Solving the Problems

In order to solve the above-mentioned problem, the present inventors have conducted extensive studies. As a result, they have found that the above-mentioned problem can be solved by immersing an unfired composite film in a solvent including water between the formation of the unfired composite film and the firing of the unfired composite film, and they have arrived at the present invention. Specifically, the present invention provides the followings.

An aspect of the present invention relates to a method for producing a porous polyimide film. The method includes, in the following order: an unfired composite film forming step of forming an unfired composite film using a varnish that contains a resin including polyamide acid and/or polyimide, fine particles, and a solvent; an immersing step of immersing the unfired composite film into a solvent including water; a firing step of firing the unfired composite film to obtain a polyimide-fine particle composite film; and a fine particle-removing step of removing the fine particles from the polyimide-fine particle composite film.

Effects of the Invention

The present invention can provide a method for producing a porous polyimide film with which it is possible to suppress the occurrence of curling in the polyimide-fine particle composite film obtained by firing the unfired composite film.

PREFERRED MODE FOR CARRYING OUT THE INVENTION

Embodiments of the present invention will now be described in detail, but the present invention is not necessarily limited to the following embodiments and can be implemented with appropriate modifications within the purpose of the present invention.

Production of Varnish

A varnish (hereinafter, also referred to as "varnish for porous polyimide film production") used for the present invention contains a resin including polyamide acid and/or polyimide, fine particles, and a solvent. The content of the fine particles in the varnish for porous polyimide film production may be appropriately adjusted corresponding to the porosity of the porous polyimide film, and the content is, for example, not less than 35% by volume, preferably not less than 50% by volume, more preferably not less than 60% by volume, and further preferably not less than 65% by volume with respect to the total of the resin and the fine particles. Furthermore, the varnish for porous polyimide film production has a viscosity at 25° C. of not less than 550 mPa·s.

When the content of fine particles is not less than 65% by volume with respect to the total of the resin and the fine particles, the porosity of the resulting porous polyimide film is not easily reduced, and the contraction rate at the time of firing of the resulting unfired composite film is not easily increased, thus easily suppressing generation of curling or wrinkles. The upper limit of the content of the fine particles is, for example, not more than 85% by volume, and preferably not more than 80% by volume with respect to the total of the resin and the fine particles. When the upper limit of the content of the fine particles is in the above-mentioned range, aggregation of fine particles is prevented, and cracking and the like is not easily generated. Consequently, porous polyimide films having excellent electrical characteristic can be formed stably. Note here that in this specification, values of "% by volume" and "volume ratio" are values at 25° C.

Furthermore, in the varnish for porous polyimide film production, the content of the total of the fine particles and the resin including polyamide acid and/or polyimide is preferably, for example, not less than 90% by mass, more preferably not less than 95% by mass with respect to the entire solid content of the varnish for porous polyimide film production (entire components excluding the below-mentioned solvents), and further preferably is adjusted to substantially 99 to 100% by mass from the viewpoint of stability of various production process.

The viscosity at 25° C. of the varnish for porous polyimide film production is preferably not less than 550 mPa·s, more preferably not less than 600 mPa·s, and further preferably not less than 700 mPa·s. The upper limit of the viscosity is not particularly limited, but from the practical viewpoint, the upper limit is not more than 3000 mPa·s, preferably not more than 2000 mPa·s, and more preferably not more than 1500 mPa·s.

Note here that the viscosity is measured by using E-type viscometer.

The varnish for porous polyimide film production is prepared by producing a solution including a resin including polyamide acid and/or polyimide and in which fine particles are dispersed. More specifically, the varnish for porous polyimide film production is prepared by, for example, mixing a solvent in which fine particles have been dispersed in advance and a resin including polyamide acid and/or polyimide at any ratios, or by polymerizing a resin including polyamide acid and/or polyimide in a solvent in which fine particles have been dispersed in advance. Any fine particles can be used without particular limitation as long as they are insoluble in the solvent to be used for the varnish and can be selectively removed after film formation.

[Polyamide Acid]

The polyamide acid used in the present invention may be any one prepared by polymerizing appropriate tetracarboxylic dianhydride and diamine. The amounts of the tetracarboxylic dianhydride and the diamine are not particularly limited, and the amount of the diamine is preferably 0.50 to 1.50 mol, more preferably 0.60 to 1.30 mol, and most preferably 0.70 to 1.20 mol, with respect to 1 mol of the tetracarboxylic dianhydride.

The tetracarboxylic dianhydride can be appropriately selected from tetracarboxylic dianhydrides that have been conventionally used as raw materials for synthesizing polyamide acids. The tetracarboxylic dianhydride may be an aromatic tetracarboxylic dianhydride or an aliphatic tetracarboxylic dianhydride, but from the viewpoint of the heat resistance of the resulting polyimide resin, an aromatic tetracarboxylic dianhydride is preferably used. The tetracarboxylic dianhydrides may be used in a combination of two or more thereof.

Preferred examples of the aromatic tetracarboxylic dianhydride include pyromellitic dianhydride, 1,1-bis(2,3-dicarboxyphenyl)ethane dianhydride, bis(2,3-dicarboxyphenyl) methane dianhydride, bis(3,4-dicarboxyphenyl)methane dianhydride, 3,3',4,4'-biphenyltetracarboxylic dianhydride, 2,3,3',4'-biphenyltetracarboxylic dianhydride, 2,2,6,6-biphenyltetracarboxylic dianhydride, 2,2-bis(3,4-dicarboxyphenyl)propane dianhydride, 2,2-bis(2,3-dicarboxyphenyl)propane dianhydride, 2,2-bis(3,4-dicarboxyphenyl)-1,1,1,3,3,3-hexafluoropropane dianhydride, 2,2-bis(2,3-dicarboxyphenyl)-1,1,1,3,3,3-hexafluoropropane dianhydride, 3,3',4,4'-benzophenonetetracarboxylic dianhydride, bis(3,4-dicarboxyphenyl)ether dianhydride, bis(2,3-dicarboxyphenyl)ether dianhydride, 2,2',3,3'-benzophenonetetracarboxylic dianhydride, 4,4-(p-phenylenedioxy)diphthalic dianhydride, 4,4-(m-phenylenedioxy)diphthalic dianhydride, 1,2,5,6-naphthalenetetracarboxylic dianhydride, 1,4,5,8-naphthalenetetracarboxylic dianhydride, 2,3,6,7-naphthalenetetracarboxylic dianhydride, 1,2,3,4-benzenetetracarboxylic dianhydride, 3,4,9,10-perylenetetracarboxylic dianhydride, 2,3,6,7-anthracenetetracarboxylic dianhydride, 1,2,7,8-phenanthrenetetracarboxylic dianhydride, 9,9-bisphthalic anhydride fluorene, and 3,3',4,4'-diphenylsulfonetetracarboxylic dianhydride. Examples of the aliphatic tetracarboxylic dianhydride include ethylenetetracarboxylic dianhydride, butanetetracarboxylic dianhydride, cyclopentanetetracarboxylic dianhydride, cyclohexanetetracarboxylic dianhydride, 1,2,4,5-cyclohexanetetracarboxylic dianhydride, and 1,2,3,4-cyclohexanetetracarboxylic dianhydride. Among these tetracarboxylic dianhydrides, 3,3',4,4'-biphenyltetracarboxylic dianhydride and pyromellitic dianhydride are preferred because of their inexpensiveness and ready availability. These tetracarboxylic dianhydrides may be used alone or as a mixture of two or more thereof.

The diamine can be appropriately selected from diamines that have been conventionally used as raw materials for synthesizing polyamide acids. The diamine may be an aromatic diamine or an aliphatic diamine, but from the viewpoint of the heat resistance of the resulting polyimide resin, an aromatic diamine is preferred. These diamines may be used in a combination of two or more thereof.

Examples of the aromatic diamine include diamino compounds having one phenyl group or about two to ten phenyl groups. Specifically, examples of the aromatic diamine include phenylenediamines and their derivatives, diaminobiphenyl compounds and their derivatives, diaminodiphenyl compounds and their derivatives, diaminotriphenyl compounds and their derivatives, diaminonaphthalenes and their derivatives, aminophenylaminoindanes and their derivatives, diaminotetraphenyl compounds and their derivatives, diaminohexaphenyl compounds and their derivatives, and cardo-type fluorenediamine derivatives.

The phenylenediamines are, for example, m-phenylenediamine and p-phenylenediamine. The phenylenediamine derivatives are diamines to which alkyl groups, such as a methyl group or an ethyl group, are bound, such as 2,4-diaminotoluene and 2,4-triphenylenediamine.

The diaminodiphenyl compounds are obtained by linkage of two aminophenyl groups at their phenyl groups. For example, the diaminodiphenyl compounds are 4,4'-diaminobiphenyl and 4,4'-diamino-2,2'-bis(trifluoromethyl)biphenyl.

The diaminodiphenyl compounds are obtained by linkage of two aminophenyl groups at their phenyl groups via another group. The linkage is, for example, an ether linkage, a sulfonyl linkage, a thioether linkage, a linkage of an alkylene or its derivative group, an imino linkage, an azo linkage, a phosphine oxide linkage, an amide linkage, or an ureylene linkage. The alkylene linkage is a linkage of an alkylene having about 1 to 6 carbon atoms, and its derivative group is an alkylene group whose one or more hydrogen atoms have been replaced by, for example, halogen atoms.

Examples of the diaminodiphenyl compounds include 3,3'-diaminodiphenyl ether, 3,4'-diaminodiphenyl ether, 4,4'-diaminodiphenyl ether, 3,3'-diaminodiphenyl sulfone, 3,4'-diaminodiphenyl sulfone, 4,4'-diaminodiphenyl sulfone, 3,3'-diaminodiphenyl methane, 3,4'-diaminodiphenyl methane, 4,4'-diaminodiphenyl methane, 4,4'-diaminodiphenyl sulfide, 3,3'-diaminodiphenyl ketone, 3,4'-diaminodiphenyl ketone, 2,2-bis(p-aminophenyl)propane, 2,2'-bis(p-aminophenyl)hexafluoropropane, 4-methyl-2,4-bis(p-aminophenyl)-1-pentene, 4-methyl-2,4-bis(p-aminophenyl)-2-pentene, iminodianiline, 4-methyl-2,4-bis(p-aminophenyl)pentane, bis(p-aminophenyl)phosphine oxide, 4,4'-diaminoazobenzene, 4,4'-diaminodiphenylurea, 4,4'-diaminodiphenylamide, 1,4-bis(4-aminophenoxy)benzene, 1,3-bis(4-aminophenoxy)benzene, 1,3-bis(3-aminophenoxy)benzene, 4,4'-bis(4-aminophenoxy)biphenyl, bis[4-(4-aminophenoxy)phenyl]sulfone, bis[4-(3-aminophenoxy)phenyl]sulfone, 2,2-bis[4-(4- aminophenoxy)phenyl]propane, and 2,2-bis[4-(4-aminophenoxy)phenyl]hexafluoropropane.

Among these, p-phenylenediamine, m-phenylenediamine, 2,4-diaminotoluene, and 4,4'-diaminodiphenylether are preferred because of their inexpensiveness and ready availability.

The diaminotriphenyl compound is formed by linkage of two aminophenyl groups and one phenylene group, all of which are each linked through another group. The "another group" is selected from the same groups as in the diaminodiphenyl compounds. Examples of the diaminotriphenyl compounds include 1,3-bis(m-aminophenoxy)benzene, 1,3-bis(p-aminophenoxy)benzene, and 1,4-bis(p-aminophenoxy)benzene.

Examples of the diaminonaphthalenes include 1,5-diaminonaphthalene and 2,6-diaminonaphthalene.

Examples of the aminophenylaminoindanes include 5- or 6-amino-1-(p-aminophenyl)-1,3,3-trimethylindane.

Examples of the diaminotetraphenyl compounds include 4,4'-bis(p-aminophenoxy)biphenyl, 2,2'-bis[p-(p'-aminophenoxy)phenyl]propane, 2,2'-bis[p-(p'-aminophenoxy)biphenyl]propane, and 2,2'-bis[p-(m-aminophenoxy)phenyl]benzophenone.

An example of the cardo-type fluorenediamine derivatives is 9,9-bisanilinefluorene.

The aliphatic diamine has, for example, about 2 to 15 carbon atoms, and specifically, examples thereof include pentamethylenediamine, hexamethylenediamine, and heptamethylenediamine.

The aliphatic diamine may be a compound having at least one substituent selected from the group consisting of halogen atoms and methyl, methoxy, cyano, and phenyl groups for hydrogen atoms of the diamine.

The polyamide acid to be used in the present invention may be produced by any method and, for example, can be produced by a known method, for example, by reacting an acid and a diamine component in a solvent.

The reaction of a tetracarboxylic dianhydride and a diamine is usually performed in a solvent. The solvent to be used for the reaction of a tetracarboxylic dianhydride and a diamine may be any solvent that can dissolve the tetracarboxylic dianhydride and the diamine without reacting with the tetracarboxylic dianhydride and the diamine. The solvent may be a single solvent or a mixture of two or more solvents.

Examples of the solvent to be used for the reaction of a tetracarboxylic dianhydride and a diamine include nitrogen-containing polar solvents, such as N-methyl-2-pyrrolidone, N,N-dimethylacetamide, N,N-diethylacetamide, N,N-dimethylformamide, N,N-diethylformamide, N-methylcaprolactam, and N,N,N',N'-tetramethylurea; lactone polar solvents, such as β-propiolactone, γ-butyrolactone, γ-valerolactone, δ-valerolactone, γ-caprolactone, and ε-caprolactone; dimethyl sulfoxide; acetonitrile; fatty acid esters, such as ethyl lactate and butyl lactate; ethers, such as diethylene glycol dimethyl ether, diethylene glycol diethyl ether, dioxane, tetrahydrofuran, methyl cellosolve acetate, and ethyl cellosolve acetate; and phenol solvents, such as cresols. These solvents may be used alone or as a mixture of two or more thereof. The amount of the solvent is not particularly limited but is desirably such that the content of the resulting polyamide acid is 5 to 50% by mass.

Among these solvents, from the viewpoint of the solubility of the resulting polyamide acid, preferred are nitrogen-containing polar solvents, such as N-methyl-2-pyrrolidone, N,N-dimethylacetamide, N,N-diethylacetamide, N,N-dimethylformamide, N,N-diethylformamide, N-methylcaprolactam, and N,N,N',N'-tetramethylurea.

The polymerization temperature is usually −10° C. to 120° C. and preferably 5° C. to 30° C. The polymerization time varies depending on the raw material composition and is usually 3 to 24 hours (hr).

The polyamide acid may be used singly or in a combination of two or more thereof.

[Polyimide]

The polyimide used in the present invention can be any known polyimide, without any limitation to its structure and molecular weight, as long as the polyimide is soluble in the solvent to be used in the varnish used in the present invention. The side chain of the polyimide may have a condensable functional group, such as a carboxy group, or a functional group enhancing the cross-linking reaction during burning.

In order to make the polyimide soluble in a solvent, it is effective to use a monomer for introducing a flexible bend structure into the main chain, for example, to use an aliphatic diamine, such as ethylenediamine, hexamethylenediamine, 1,4-diaminocyclohexane, 1,3-diaminocyclohexane, or 4,4'-diaminodicyclohexylmethane; an aromatic diamine, such as 2-methyl-1,4-phenylenediamine, o-tolidine, m-tolidine, 3,3'-dimethoxybenzidine, or 4,4'-diaminobenzanilide; a polyoxyalkylenediamine, such as polyoxyethylenediamine, polyoxypropylenediamine, or polyoxybutyrenediamine; a polysiloxanediamine; 2,3,3',4'-oxydiphthalic anhydride, 3,4,3',4'-oxydiphthalic anhydride, or 2,2-bis(4-hydroxyphenyl)propanedibenzoate-3,3',4,4'-tetracarboxylic dianhydride. It is also effective to use a monomer containing a functional group for improving the solubility in a solvent, for example, to use a fluorinated diamine, such as 2,2'-bis(trifluoromethyl)-4,4'-diaminobiphenyl or 2-trifluoromethyl-1,4-phenylenediamine. Furthermore, in addition to the monomer for improving the solubility of the polyimide, a monomer that is mentioned in the paragraph describing the polyamide acid may be used within a range that does not inhibit the solubility.

The polyimide soluble in a solvent to be used in the present invention may be produced by any method and, for example, can be produced by a known method of, for example, chemically imidizing or thermally imidizing a polyamide acid and dissolving the imidized polyimide in a solvent. Examples of such polyimides include aliphatic polyimide (full-aliphatic polyimides) and aromatic polyimides, and aromatic polyimides are preferred. The aromatic polyimide may be one prepared by a thermal or chemical ring-closing reaction of a polyamide acid having repeating units represented by Formula (1) or one prepared by dissolving a polyimide having repeating units represented by Formula (2) in a solvent. In the formulae, Ar represents an aryl group.

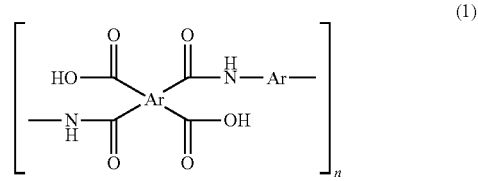

(1)

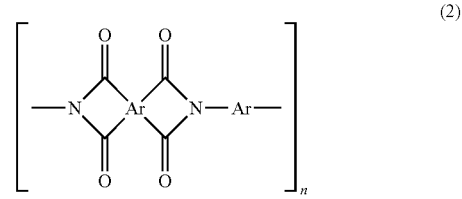

(2)

The varnish used in the present invention can be produced by mixing a resin including polyamide acid and/or polyimide with a solvent in which fine particles are dispersed in advance at an appropriate ratio, or by polymerizing a tetracarboxylic dianhydride and a diamine into a polyamide acid in a solvent in which fine particles are dispersed in advance, or by further performing imidization into a polyimide.

When fine particles and a resin including polyamide acid and/or polyimide are fired into a polyimide-fine particle composite film and when the material of the fine particles is an inorganic material described below, the fine particles and the resin including polyamide acid and/or polyimide may be mixed with each other such that the ratio of the fine particles to the polyimide is, for example, 1 to 7.5 (mass ratio), preferably 2 to 6 (mass ratio). The ratio is more preferably 3 to 5 (mass ratio). When the material of the fine particles is an organic material described below, the fine particles and the resin including polyamide acid and/or polyimide may be mixed with each other such that the ratio of the fine particles to the polyimide is 1 to 3.5 (mass ratio). The ratio is more preferably 1.2 to 3 (mass ratio). Alternatively, the fine particles and the resin including polyamide acid and/or polyimide may be mixed with each other such that the volume ratio of the fine particles to the polyamide is, for example, 0.5 to 5, preferably 1.5 to 4.5 when a polyimide-fine particle composite film is formed. The ratio is more preferably 1.8 to 3 (volume ratio). When the mass ratio or volume ratio of the fine particles to the polyimide is not lower than the lower limit in a polyimide-fine particle composite film, the film can have pores at an appropriate density as a separator. When the mass ratio or volume ratio is not higher than the upper limit, a film can be stably formed without causing problems such as an increase in viscosity or cracking in the film. The polyimide may be used singly or in a combination of two or more thereof.

[Fine Particles]

The material of the fine particles used in the present invention is not particularly limited and may be any known material as long as the material is insoluble in the solvent used in the varnish and can be removed later from the polyimide film. Examples of the inorganic material include metal oxides, such as silica (silicon dioxide), titanium oxide, and alumina ($Al_2O_3$). Examples of the organic materials include high-molecular-weight olefins (such as polypropylene and polyethylene) and organic polymer fine particles, such as polystyrenes, epoxy resins, celluloses, polyvinyl alcohols, polyvinyl butyrals, polyesters, and polyethers.

Specific examples of the fine particles include colloidal silica. In particular, it is preferable to select monodisperse spherical silica particles because uniform pores can be formed.

The fine particles to be used in the present invention preferably have a high sphericity and a low particle diameter distribution index. The particle diameter distribution index (d25/d75) of the fine particles is, for example, 1 to 6. Fine particles satisfying these requirements show excellent dispersibility in the varnish and can be used without causing aggregation with one another. When the particle diameter distribution index is 1 to 1.5, the hole diameters of the porous film can be easily made uniform. When the particle diameter distribution index is 1.5 to 6, and preferably 2 to 6, the inside of the film can be filled with particles efficiently, and a passage for allowing pores inside the obtained porous polyimide film to be communicated with each other can be easily formed. The average particle diameter of the fine particles to be used is preferably, for example, 50 to 5000 nm, preferably 100 to 2000 nm, more preferably 300 to 2000 nm, further preferably 500 to 2000 nm, and particularly preferably 700 to 2000 nm. The fine particles satisfying these requirements are preferable because it is possible to homogenize diameters of the pores of the porous film obtained by removing the fine particles and to unify the electric field to be applied to the separator. The fine particles may be used singly or may be used in a combination of two or more thereof.

[Solvent]

As the solvent to be used in the present invention, those described as an example of the solvents used for reaction between tetracarboxylic dianhydride and diamine can be used without limitation as long as the solvents can solve the resin including polyamide acid and/or polyimide and does not solve the fine particles. The solvent may be used singly or may be used in a combination of two or more thereof.

From the view point of the applicability, it is preferable that the content of a solvent in the varnish for porous polyimide film production is not less than 60% by mass with respect to the entire varnish for porous polyimide film production (that is, an amount corresponding to the solid content concentration in the varnish for porous polyimide film production becomes not more than 40% by mass). The content of the solvent is an amount corresponding to the solid content concentration in the varnish for porous polyimide film production of more preferably 20 to 40% by mass, further preferably 30 to 39% by mass, and further more preferably 33 to 38% by mass.

[Dispersing Agent]

In the present invention, the varnish may further contain a dispersant in addition to the fine particles, in order to uniformly disperse the fine particles in the varnish. The addition of the dispersant allows further uniform mixing of the resin including polyamide acid and/or polyimide the fine particles, and, in addition, allows uniform dispersion of the fine particles in the molded or formed precursor film. As a result, dense apertures are provided on the surface of the finally formed porous polyimide, and the front and rear surfaces can be efficiently communicated with each other so as to improve the air permeability of the film. Furthermore, addition of the dispersant easily improves drying of the varnish for porous polyimide film production, and easily improves peelability of the formed unfired composite film from the substrate and the like.

The dispersant used in the present invention is not particularly limited and may be any known one. Examples of the dispersant include, but not limited to, anionic surfactants, such as salts of coconut fatty acid, salts of sulfonated castor oil, lauryl sulfate, polyoxyalkylene allylphenyl ether sulfate, alkylbenzenesulfonic acid, alkylbenzene sulfonate, alkyldiphenyl ether disulfonate, alkylnaphthalene sulfonate, dialkyl sulfosuccinate, isopropyl phosphate, polyoxyethylene alkyl ether phosphate, and polyoxyethylene allylphenyl ether phosphate; cationic surfactants, such as oleylamine acetate, lauryl pyridinium chloride, cetyl pyridinium chloride, lauryl trimethylammonium chloride, stearyl trimethylammonium chloride, behenyl trimethylammonium chloride, and didecyl dimethylammonium chloride; amphoteric surfactants, such as coconut alkyl dimethylamine oxide, fatty acid amide propyl dimethyl amine oxide, alkyl polyaminoethyl glycine hydrochloride, amide betaine surfactant, alanine surfactant, and lauryl iminodipropionic acid; polyoxyalkylene primary alkyl ether or polyoxyalkylene secondary alkyl ether nonionic surfactants, such as polyoxyethylene octyl ether, polyoxyethylene decyl ether, polyoxyethylene lauryl ether, polyoxyethylene laurylamine, polyoxyethylene oleylamine, polyoxyethylene polystyryl phenyl ether, and polyoxyalkylene polystyryl phenyl ether; other polyoxyalkylene nonionic surfactants, such as polyoxyethylene dilaurate, polyoxyethylene laurate, polyoxyethylenated castor oil, polyoxyethylenated hydrogenated castor oil, sorbitan laurate, polyoxyethylene sorbitan laurate, and fatty acid diethanolamide; fatty acid alkyl esters, such as octyl stearate and trimethylolpropane tridecanoate; and polyether polyols, such as polyoxyalkylene butyl ether, polyoxyalkylene oleyl ether, and trimethylol propane tris(polyoxyalkylene) ether. These dispersants may be used as a mixture of two or more thereof.

From the view point of the film formability, it is preferable that the content of the dispersant in the varnish for porous polyimide film production is, for example, 0.01 to 5% by mass with respect to the fine particles, and the content is more preferably 0.05 to 1% by mass, and further more preferably 0.1 to 0.5% by mass.

Method for Producing Porous Polyimide Film

A method for producing a porous polyimide film according to the present invention includes, in the following order: an unfired composite film forming step of forming an unfired composite film using a varnish that contains a resin including polyamide acid and/or polyimide, fine particles, and a solvent; an immersing step of immersing the unfired composite film into a solvent including water; a firing step of firing the unfired composite film to obtain a polyimide-fine particle composite film; and a fine particle-removing step of removing the fine particles from the polyimide-fine particle composite film.

[Method for Forming Unfired Composite Film (Unfired Composite Film Forming Step)]

A method for forming an unfired composite film in the present invention will now be described. In an unfired composite film forming step, an unfired composite film is formed using a varnish for porous polyimide film production. At the time, the unfired composite film may be formed on a substrate or on a lower film that is different from the unfired composite film. The unfired composite film can be formed by, for example, applying a varnish for porous polyimide film production onto the substrate or the lower film, and drying thereof at normal pressure or under vacuum at 0 to 100° C., and preferably at normal pressure at 10 to 100° C. Examples of the substrate include a PET film, a SUS substrate, a glass substrate, and the like.

Examples of the lower film include a lower unfired composite film formed using a varnish for a lower film containing a resin including polyamide acid and/or polyimide, fine particles, and a solvent, wherein the content of the fine particles is more than 65% by volume and not more than 81% by volume with respect to the total of the resin and the fine particles. The lower unfired composite film may be a film formed on the substrate. When the content of the fine particles is more than 65% by volume, the particles are uniformly dispersed, and when the content of the fine particles is not more than 81% by volume, the particles are dispersed without causing aggregation with one another to allow uniform formation of pores in the porous polyimide film. Furthermore, when the content of the fine particles is within the above-mentioned range, when the lower unfired composite film is formed on the substrate, even when the substrate is not provided with a mold release layer in advance, mold releasability after film formation can be easily secured.

Note here that the fine particles to be used for the varnish for the lower film and the fine particles to be used for the varnish for porous polyimide film production may be the same as or different from each other. In order to increase the density of pores in the lower unfired composite film, it is preferable that the fine particles to be used for the varnish for the lower film has a particle diameter distribution index that is equal to or smaller than that of the fine particles to be used for the varnish for porous polyimide film production. Alternatively, it is preferable that the fine particles to be used for the varnish for the lower film has a sphericity that is equal to or smaller than that of the fine particles to be used for the varnish for porous polyimide film production.

Furthermore, it is preferable that an average particle diameter of the fine particles to be used for the varnish for a lower film is smaller than that of the fine particles to be used for the varnish for porous polyimide film production. It is particularly preferable that the average particle diameter of the fine particles to be used for the varnish for a lower film is 100 to 1000 nm (preferably 100 to 600 nm), and the average particle diameter of the fine particles to be used for the varnish for porous polyimide film production is preferably 300 to 5000 nm (more preferably 500 to 2000 nm, and further more preferably 700 to 2000 nm).

Furthermore, it is preferable that the content of fine particles in the varnish for a lower film is larger than that of the varnish for porous polyimide film production. The resin including polyamide acid and/or polyimide, the fine particle, the solvent, and the substrate are as mentioned above. The lower unfired composite film can be formed by, for example, applying the varnish for a lower film onto the substrate, followed by drying at normal pressure or under vacuum at 0 to 100° C., and preferably at normal pressure at 10 to 100° C.

Furthermore, examples of the lower film include lower films made of fiber materials such as cellulose resin, non-woven fabric (for example, polyimide non-woven fabric or the like. A fiber diameter is, for example, about 50 nm to about 3000 nm) and, polyimide film, and the like.

Furthermore, a firing step of firing the unfired composite film or a laminated film of the unfired composite film and the lower film to obtain a polyimide-fine particle composite film is carried out. When the unfired composite film or the lower unfired composite film is formed on the substrate, firing may be carried out as it is, or the unfired composite film or the laminated film of the unfired composite film and the lower unfired composite film may be peeled off from the substrate before carrying out the firing step.

When the lower film in the laminated film is a lower unfired composite film formed by using the varnish for a lower film, and the composition of the varnish for a lower film is the same as the composition of the varnish for porous polyimide film production to be used for forming the unfired composite film, the laminated film of the unfired composite film and the lower film is substantially one layer (single layer). However, such a film is referred to as a "laminated film" in this specification.

When the unfired composite film or the laminated film of the unfired composite film and the lower unfired composite film is peeled from the substrate, the substrate provided with a mold release layer in advance can also be used in order to further enhance the releasability of the film. In a case of providing a mold release layer in the substrate in advance, the mold release agent is applied onto the substrate and is dried or baked before the application of the varnish. The mold release agent used here may be a known mold release agent, such as an alkylphosphate ammonium salt-based or fluorine-based agent or silicon, without particular restriction. When the dried unfired composite film is peeled from the substrate, a slight amount of the mold release agent remains on the surface of the peeled unfired composite film and may lead to discoloration during firing and adverse effects to the electrical characteristics, and the mold release agent should therefore be removed as much as possible. In order to remove the mold release agent, the unfired composite film or the laminated film of the unfired composite film and the lower unfired composite film peeled from the substrate is preferably washed with an organic solvent.

Alternatively, when the unfired composite film or the lower unfired composite film is directly used without being provided with a mold release layer, the steps of forming the mold release layer and the washing step can be omitted.

[Immersion into Solvent Including Water (Immersing Step)]

In an immersing step, the unfired composite film is immersed into a solvent including water. In the unfired composite film, a solvent used for production thereof usually remains. When the unfired composite film is fired in a state in which the solvent for production remains, unevenness in distribution of the solvent for production in the film may easily occur, resulting in causing curling of the polyimide-fine particle composite film to easily occur. On the other hand, when the unfired composite film is immersed in a solvent including water, the solvent for production remaining in the unfired composite film is dissolved into the solvent including water, the amount of the solvent for production remaining in the unfired composite film is reduced. As a result, unevenness in distribution of the solvent for production in the film does not easily occur, thus easily suppressing occurrence of curling in the polyimide-fine particle composite film.

The solvent including water is, for example, a solvent including not less than 5% by mass of water. The solvent including water is preferably a solvent including water as a main component, and more preferably a solvent including not less than 50% by mass of water, further preferably a solvent including not less than 70% by mass of water, and particularly preferably a solvent including not less than 90% by mass of water. The solvent may be 100% by mass water. Other solvents contained in the solvent including water include a water-soluble organic solvent. Examples thereof include nitrogen-containing polar solvents such as N-methyl-2-pyrrolidone and dimethyl acetamide, and alcoholic solvents such as methanol, ethanol, and isopropyl alcohol. The content of the water-soluble organic solvent with respect to the entire solvent including water is, for example, 0 to 95% by mass, preferably 1 to 50% by mass, and more preferably 1 to 30% by mass.

Immersion time is not particularly limited, but the time is preferably 1 minute to 10 minutes and more preferably 3 to 5 minutes. When the immersion time is in the range, the occurrence of curling in the polyimide-fine particle composite film is easily suppressed.

An immersion temperature is not particularly limited, but the temperature is, for example, 5 to 60° C., more preferably 15 to 35° C., and more preferably 23 to 30° C. When the immersion temperature is in the range, the occurrence of curling in the polyimide-fine particle composite film is easily suppressed.

When the unfired composite film is formed on a substrate in the unfired composite film forming step, in the immersing step, the unfired composite film may be peeled off from the substrate and immersed in the solvent including water, or the unfired composite film formed on the substrate may be immersed in the solvent including water. It is preferable that the unfired composite film is peeled off from the substrate and immersed in the solvent including water in the immersing step because the unfired composite film is easily peeled off from the substrate after the immersing step.

It is preferable that the method for producing a porous polyimide film according to the present invention further includes, between the immersing step and the below-mentioned firing step, a step of removing the solvent including water from the unfired composite film after the immersing step. Examples of the method for removing the solvent including water include a pressing step or a drying step mentioned below. Removing of the solvent including water by the pressing step is preferable because generation of wrinkles (unevenness or undulation) is easily suppressed.

[Pressing of Unfired Composite Film after Immersing Step (Pressing Step)]

The method for producing a porous polyimide film according to the present invention may further include, between the immersing step and the firing step, a pressing step of pressing the unfired composite film after the immersing step. Pressing of the unfired composite film after the immersing step easily suppresses generation of wrinkles (unevenness or undulation) in the polyimide-fine particle composite film obtained by firing the unfired composite film.

When the method for producing a porous polyimide film according to the present invention includes a pressing step, a varnish for porous polyimide film production may be applied on the substrate to form an unfired composite film on the substrate in the unfired composite film forming step, and the unfired composite film may be peeled off from the substrate and immersed in the solvent including water in the immersing step. Alternatively, a varnish for porous polyimide film production may be applied on the substrate to form an unfired composite film on the substrate in the unfired composite film forming step, and the unfired composite film formed on the substrate may be immersed in the solvent including water in the immersing step. It is preferable that a varnish for porous polyimide film production may be applied on the substrate to form an unfired composite film on the substrate in the unfired composite film forming step, and the unfired composite film may be peeled off from the substrate and immersed in the solvent including water in the immersing step, because the unfired composite film is easily peeled off from the substrate after the immersing step.

A pressing method is not particularly limited. Examples of the method include a method for allowing a roller such as a water absorbing roller to be brought into contact with or to be sandwiched by the unfired composite film after the immersing step, a method of compression-bonding a film onto both main surfaces of the unfired composite film after the immersing step, a method of pressing the unfired composite film after the immersing step using a roller, and the like. Pressure at the time of pressing is not particularly limited, and the pressure is, for example, 0.1 to 10 kg/cm$^2$, and preferably 1 to 8 kg/cm$^2$. Furthermore, a temperature at the time of pressing is not particularly limited, and the temperature is, for example, 10 to 120° C., and preferably 20 to 100° C. Examples of the film include a PET film, and the like. Rollers to be used in pressing by a roller is not particularly limited, and conventionally well-known rolls can be used. A water absorbing roller may be used.

More specifically, when a varnish for porous polyimide film production is applied onto the substrate to form an unfired composite film on the substrate in the unfired composite film forming step, and the unfired composite film is peeled off from the substrate and immersed in a solvent including water in the immersing step, pressing can be carried out by compression-bonding a film on both main surfaces of the unfired composite film which has been peeled off from the substrate. Furthermore, when a varnish for porous polyimide film production is applied on the substrate to form an unfired composite film on the substrate in the unfired composite film forming step, and the unfired composite film formed on the substrate is immersed in the solvent including water in the immersing step, a new film is adhesively attached to a main surface opposite to the main surface with which the substrate is in contact, and the substrate and the newly attached film are compression-bonded onto the both main surfaces of the unfired composite film. Thus, pressing can be carried out.

When the method for producing a porous polyimide film according to the present invention includes the below-mentioned drying step, pressing of the unfired composite film in the pressing step and drying in the drying step may be carried out at the same time. For example, when a temperature at the time of pressing and a drying temperature in the drying step are set to be the same as each other, or pressing is carried out using a water absorbing roller, the pressing of the unfired composite film in the pressing step and the drying in the drying step can be carried out at the same time.

[Drying of Unfired Composite Film after Immersing Step (Drying Step)]

The method for producing a porous polyimide film according to the present invention may further include a drying step of drying the unfired composite film after the immersing step, between the immersing step and the firing step. The drying of the unfired composite film after the immersing step makes it easy to suppress the generation of curling or wrinkles (unevenness or undulation) in the polyimide-fine particle composite film obtained by firing the unfired composite film.

The method for drying the unfired composite film by removing the solvent including water from the unfired composite film after the immersing step is not particularly limited, and the examples of the method include drying by heating, air drying, drying under reduced pressure, and the like. The drying temperature is not particularly limited, and is, for example, 20 to 120° C., and preferably 20 to 100° C.

When the method for producing a porous polyimide film according to the present invention includes the above-mentioned pressing step, the production method may include a drying step between the immersing step and the pressing step, or may include a drying step between the pressing step and the firing step. Drying in the drying step and the pressing of the unfired composite film in the pressing step may be carried out at the same time. For example, when a temperature at the time of pressing and a drying temperature in the drying step are set to be the same as each other, or pressing is carried out using a water absorbing roller, the pressing of the unfired composite film in the pressing step and the drying in the drying step can be carried out at the same time.

[Production of Polyimide-Fine Particle Composite Film (Firing Step)]

The unfired composite film is heated as post-treatment (firing) into a composite film (polyimide-fine particle composite film) composed of a polyimide and fine particles. In the unfired composite film forming step, when the unfired composite film is formed on a lower film that is different from the unfired composite film, the lower film together with the unfired composite film is fired in the firing step. The firing temperature in the firing step varies depending on the structures of the unfired composite film and the lower film and the presence of a condensing agent, and is, for example, 120 to 450° C., preferably 120 to 400° C., preferably 120° C. to 375° C. and furthermore preferably 150° C. to 350° C. In a case of using an organic material for the fine particles, the firing temperature must be set to a temperature lower than the thermal decomposition temperature of the organic material. In the firing step, it is preferable that imidization is completed.

The firing may be performed by, for example, a method of increasing the temperature from room temperature to 375° C. over three hours and then holding 375° C. for 20 minutes or a method of stepwise drying-thermal imidization by stepwise increasing the temperature by 50° C. from room temperature to 375° C. (holding the temperature of each step for 20 minutes) and finally holding 375° C. for 20 minutes. When the unfired composite film is formed on the substrate and the unfired composite film is peeled from the substrate once, an end of the unfired composite film may be fixed to, for example, a frame made of SUS stainless steel to prevent deformation.

The thickness of the resulting polyimide-fine particle composite film can be determined by, for example, measuring the thicknesses of a plurality of positions with a micrometer or the like and averaging the thicknesses. Preferred average film thickness varies depending on the purpose of the polyimide-fine particle composite film or the porous polyimide film, however, is preferably 5 to 500 μm and more preferably 10 to 100 μm, in the use as a separator for example.

[Porosification of Polyimide-Fine Particle Composite Film (Fine Particle-Removing Step)]

The porous polyimide film can be produced with high reproducibility by selecting an appropriate method for removing the fine particles from the polyimide-fine particle composite film.

For example, when silica is employed as the material of the fine particles, the silica can be removed by treating the polyimide-fine particle composite film with, for example, a low-concentration hydrogen fluoride solution to dissolve the silica.

Alternatively, an organic material may also selected as the material of the fine particles. Any organic material, which is decomposed at a temperature lower than polyimide, may be used. Examples of the fine particles include resin particulates composed of linear polymers and known depolymerizable polymers. The linear polymer usually has a molecular chain that is randomly cleaved during thermal decomposition; and the depolymerizable polymer is decomposed into a monomer during thermal decomposition. Both of them are decomposed into a low molecular weight substance or to $CO_2$ and disappear from the polyimide film. The resin fine particles to be used preferably have a decomposition temperature of 200° C. to 320° C. and more preferably 230° C. to 260° C. A decomposition temperature of 200° C. or more allows formation of a film even if the varnish contains a high boiling point solvent and broadens the selection of firing conditions of the polyimide. In addition, a decomposition temperature of lower than 320° C. allows the resin fine particles to disappear without thermally damaging the polyimide.

The total thickness of the porous polyimide film produced by production method of the present invention is not particularly limited and is preferably 5 μm or more and 500 μm or less, more preferably 10 μm or more and 100 μm or less, and most preferably 10 μm or more and 30 μm or less. The above-mentioned thickness can be determined by, for example, measuring the thicknesses of a plurality of positions with a micrometer or the like and averaging the thicknesses, as in the polyimide-fine particle composite film.

A layer formed of the varnish for porous polyimide film production has a thickness of, for example, 3 µm or more and 500 µm or less, preferably 4.3 µm or more and 500 µm or less, more preferably 4.5 µm or more and 99.7 µm or less, and further more preferably 5 µm or more and 29.7 µm or less. In the above-mentioned unfired composite film forming step, when the unfired composite film is formed on the lower layer that is different from the unfired composite film, the layer formed of the lower film has a thickness of, for example, 0.3 µm or more and 40 µm or less, preferably 0.3 µm or more and 5 µm or less, more preferably 0.4 µm or more and 4 µm or less, and further more preferably 0.5 µm or more and 3 µm or less. The thickness of each layer can be calculated by averaging thicknesses at a plurality of positions in a cross section of the porous polyimide film by observing under, for example, a scanning electron microscope (SEM).

[Polyimide-Removing Step]

A method for producing a porous polyimide film according to the present invention may include a polyimide-removing step of removing at least a part of a polyimide portion of a polyimide-fine particle composite film before the fine particle-removing step, or removing at least a part of the porous polyimide film after the fine particle-removing step. When at least a part of the polyimide-fine particle composite film is removed before the fine particle-removing step and when the fine particles are removed in the subsequent fine particle-removing step, when pores are formed, the aperture rate of the porous polyimide film of the final product can be improved as compared with the case where at least a part of the polyimide portion is not removed. Furthermore, when at least a part of the porous polyimide film is removed after the fine particle-removing step, the aperture rate of the porous polyimide film of the final product can be improved as compared with the case where the at least a part of the porous polyimide film is not removed.

The step of removing at least a part of the polyimide portion or the step of removing at least a part of the porous polyimide film can be carried out by a usual chemical etching or physical removing method, or a method combining these methods.

The chemical etching method includes treatment using a chemical etchant such as an inorganic alkaline solution or an organic alkaline solution. An inorganic alkaline solution is preferable. Examples of the inorganic alkaline solution include a hydrazine solution including hydrazine hydrate and ethylenediamine; a solution of alkaline metal hydroxide such as potassium hydroxide, sodium hydroxide, sodium carbonate, sodium silicate, and sodium metasilicate; an ammonium solution; an etchant including alkali hydroxide, hydrazine, and 1,3-dimethyl-2-imidazolidinone as a main component, or the like. Examples of the organic alkaline solution include an alkaline solution of primary amines such as ethyl amine and n-propyl amine; secondary amines such as diethyl amine and di-n-butylamine; tertiary amines such as triethylamine and methyl diethyl amine; alcohol amines such as dimethyl ethanol amine and triethanolamine; quaternary ammonium salts such as tetramethylammonium hydroxide and tetraethylammonium hydroxide; cyclic amines such as pyrrole and piperidine, or the like.

As a solvent for each solution, pure water and alcohols can be appropriately selected. Furthermore, solvents in which an appropriate amount of surfactant is added can be used. An alkali concentration is, for example, 0.01 to 20% by mass.

Furthermore, examples of the physical method include dry etching by plasma (oxygen, argon, etc.), corona discharge, or the like, a method for treating a surface of a polyimide film by dispersing abrasives (for example, alumina (rigidity 9), or the like) in a liquid and irradiating the surface of aromatic polyimide film with the liquid at the irradiation rate of 30 to 100 m/s, and the like.

The above-mentioned methods are preferable because they are applicable in the polyimide-removing step before the fine particle-removing step or after the fine particle-removing step.

On the other hand, as the physical method that can be applied only to the polyimide-removing step carried out after the fine particle-removing step, a method of compression bonding a mount film (for example, a polyester film such as a PET film) whose subject surface is wetted with liquid and then peeling a porous polyimide film from the mount film after drying or without drying can be employed. Due to the surface tension of the liquid or electrostatic adhesion, the porous polyimide film is peeled from the mount film with only the surface layer of the porous polyimide film left on the mount film.

[Use of Porous Polyimide Film]

The porous polyimide film produced by the method of the present invention can be used as the separator of a lithium-ion battery, a fuel cell electrolyte film, a film for separating a gas or liquid, or a low dielectric constant material. The above-mentioned porous polyimide film can be used as the separator for a secondary battery, such as a nickel cadmium or nickel hydrogen battery or a lithium ion secondary battery and is particularly preferably used as the porous separator for a lithium ion secondary battery. In particular, when the porous polyimide film is used as the separator for a lithium-ion battery, in the unfired composite film forming step, the unfired composite film is formed on a lower film that is different from the unfired composite film, a lower film that has been formed using the varnish for the lower film production is used as the lower film, and a surface at a lower film side is arranged at the negative electrode side of the lithium ion battery. Thus, the battery performance can be improved.

Secondary Battery

The secondary battery in the present invention is characterized in that an electrolytic solution and a separator formed of a porous polyimide film produced by a production method according to the present invention are arranged between the negative electrode and the positive electrode.

The secondary battery of the present invention may be of any type and may have any configuration. The secondary battery is not particularly limited to known secondary batteries such as nickel cadmium and nickel hydrogen batteries as well as a lithium ion secondary battery, as long as the battery has a configuration in which battery elements, a positive electrode, a separator, and a negative electrode laminated in this order so as to satisfy the above-described requirements, are impregnated with an electrolytic solution and are encapsulated in an outer package.

The negative electrode of the secondary battery of the present invention can have a structure in which a negative electrode mixture composed of a negative electrode active material, a conductive auxiliary agent, and a binder is formed on a collector. For example, as the negative electrode active material, cadmium hydroxide can be used in nickel cadmium batteries, and a hydrogen-occlusion alloy can be used in nickel hydrogen batteries. In lithium ion secondary batteries, a material that can be electrochemically doped with lithium can be employed. Examples of such active materials include carbon materials, silicon, aluminum, tin, and Wood's alloy.

Examples of the conductive auxiliary agent constituting the negative electrode include carbon materials such as acetylene black and Ketjen black. The binder is composed of an organic polymer, and examples thereof include polyvinylidene fluoride and carboxymethyl cellulose. The collector can be, for example, copper foil, stainless steel foil, or nickel foil.

The positive electrode can have a structure in which a positive electrode mixture composed of a positive electrode active material, a conductive auxiliary agent, and a binder is formed on a collector. For example, the positive electrode active material can be nickel hydroxide in nickel cadmium batteries and can be nickel hydroxide or nickel oxyhydroxide in nickel hydrogen batteries. Meanwhile, in lithium ion secondary batteries, examples of the positive electrode active material include lithium-containing transition metal oxides, specifically, $LiCoO_2$, $LiNiO_2$, $LiMn_{0.5}Ni_{0.5}O_2$, $LiCo_{1/3}Ni_{1/3}Mn_{1/3}O_2$, $LiMn_2O_4$, $LiFePO_4$, $LiCo_{0.5}Ni_{0.5}O_2$, and $LiAl_{0.25}Ni_{0.75}O_2$. Examples of the conductive auxiliary agent include carbon materials such as acetylene black and Ketjen black. The binder is an organic polymer, and examples thereof include polyvinylidene fluoride. The collector can be, for example, aluminum foil, stainless steel foil, or titanium foil.

The electrolytic solution in, for example, a nickel cadmium battery or a nickel hydrogen battery is a potassium hydroxide solution. The electrolytic solution in a lithium ion secondary battery is composed by dissolving a lithium salt in a non-aqueous solvent. Examples of the lithium salt include $LiPF_6$, $LiBF_4$, and $LiClO_4$. Examples of the non-aqueous solvent include propylene carbonate, ethylene carbonate, dimethyl carbonate, diethyl carbonate, ethyl methyl carbonate, γ-butyrolactone, and vinylene carbonate. These solvents may be used alone or as a mixture.

Examples of the outer package material include metal cans and aluminum laminate packs. The shape of the battery is, for example, a rectangular shape, a cylindrical shape, or a coin shape; however, the separator formed of a porous polyimide film produced by a production method according to the present invention can be suitably applied to any shape.

EXAMPLES

The present invention will now be more specifically described with reference to Examples, but the scope of the present invention is not limited to the following Examples.

In Examples and Comparative Examples, the following tetracarboxylic dianhydride, diamine, organic solvents, dispersants, and fine particles were used.
Polyamide acid solution: reaction product of tetracarboxylic dianhydride (pyromellitic acid dianhydride) and diamine (4,4'-diaminodiphenylether) (reaction solvent: N,N-dimethylacetamide)
Dispersant: polyoxyethylene secondary alkyl ether dispersant
Fine Particles
  Silica (1): silica having an average particle diameter of 300 nm
  Silica (2): silica having an average particle diameter of 700 nm
[Preparation of Varnish]
(1) First Varnish (Varnish for Lower Film)
  Silica 1 (85 parts by mass) and each organic solvent of N,N-dimethylacetamide and γ-butyrolactone were added to a polyamide acid solution (polyamide acid basis: 15 parts by mass) (at the time, an addition amount of the organic solvent was adjusted so that the ratio of the organic solvent in the varnish (N,N-dimethylacetamide: γ-butyrolactone) was 90:10 (mass ratio)). The components were mixed, and the mixture was stirred to prepare a first varnish having a volume ratio of polyamide acid to fine particles of 22:78 (mass ratio: 15:85).
(2) Second Varnish (Varnish for Porous Polyimide Film Production)
  A polyamide acid solution (polyamide acid basis: 19.6 parts by mass), silica 2 (80 parts by mass) and a dispersant (0.4 parts by mass) were mixed with each other, and organic solvents of N,N-dimethylacetamide and γ-butyrolactone were each additionally added if necessary (at the time, an addition amount of the organic solvent was adjusted so that the ratio of the organic solvent to the varnish (N,N-dimethylacetamide:γ-butyrolactone) was 90:10 (mass ratio)) to prepare a second varnish having the solid content concentration of 35% by mass. [Formation of Unfired Composite Film (Single Layer)]

The above-mentioned second varnish was applied onto a PET film using an applicator, the film was subjected to pre-baking at 70° C. for 5 minutes to form an unfired composite film (single layer) having a thickness of about 25 μm.

[Formation of Unfired Composite Film (Double Layer)]

The above-mentioned first varnish was applied onto a PET film using an applicator, the applied film was subjected to pre-baking at 70° C. for 1 minute to form a lower unfired composite film having a thickness of about 3 μm. Subsequently, a second varnish was applied thereon to form a film using an applicator. The film was subjected to pre-baking at 70° C. for five minutes to form an unfired composite film having a thickness of about 25 μm.

Example 1

The (double layer) unfired composite film was peeled off from the PET film, and then immersed in 500 g of water for three minutes. Thereafter, the unfired composite film was allowed to pass between two rollers to press the unfired composite film. At the time, a roller pressing pressure was 3.0 kg/cm$^2$, a roller temperature was room temperature, and the movement speed of the unfired composite film was 0.5 m/min. The unfired composite film after pressing was subjected to thermal treatment (firing) at 320° C. for 15 minutes to complete imidization. Thus, a polyimide-fine particle composite film was obtained. The polyimide-fine particle composite film was immersed in a 10% by mass of HF solution for ten minutes to remove fine particles contained in the film to obtain a porous polyimide film. The porous polyimide film was immersed in an alkaline etchant for 20 seconds to remove a part of the polyimide surface, thus carrying out chemical etching (hereinafter, also referred to as "CE"). Note here that the etchant was produced by diluting 2.38% by mass of aqueous solution of TMAH with 50% by mass of aqueous solution of methanol so that the concentration became 1.04%.

Example 2

A polyimide-fine particle composite film and a porous polyimide film were obtained, and chemical etching was carried out in the same manner as in Example 1 except that the unfired composite film was not pressed after it was immersed in 500 g of water for three minutes and was air-dried for one hour, and the unfired composite film was subjected to direct imidization in Example 1.

Example 3

A polyimide-fine particle composite film and a porous polyimide film were obtained, and chemical etching was carried out in the same manner as in Example 1 except that the roller temperature was set at 80° C. in Example 1. Note here that in Example 3, evaluation of the unfired composite film (single layer) was similarly carried out.

Comparative Example 1

A polyimide-fine particle composite film and a porous polyimide film were obtained, and chemical etching was carried out in the same manner as in Example 1 except that the unfired composite film which had been peeled off from the PET film was directly imidized without carrying out the immersing step of immersing the unfired composite film in water for three minutes and the pressing step, and the time of chemical etching was changed from 20 seconds to 80 seconds in Example 1.

Comparative Example 2

A polyimide-fine particle composite film and a porous polyimide film were obtained, and chemical etching was carried out in the same manner as in Example 1 except that the unfired composite film which had been peeled off from the PET film was allowed to directly pass between two rollers to press the unfired composite film without carrying out the immersing step of immersing the unfired composite film in water for three minutes, and the time of chemical etching was changed from 20 seconds to 80 seconds in Example 1.

Comparative Example 3

A polyimide-fine particle composite film and a porous polyimide film were obtained, and chemical etching was carried out in the same manner as in Example 1 except that the unfired composite film which had been peeled off from the PET film was directly air-dried for 24 hours without carrying out the immersing step of immersing the unfired composite film in water for three minutes and the pressing step, the air-dried unfired composite film was directly imidized, and the time of chemical etching was changed from 20 seconds to 80 seconds in Example 1.

Example 4

The (double layer) unfired composite film was peeled off from the PET film, and then immersed in 500 g of solvent including water (mass ratio: isopropanol:water=10:90) for three minutes. Thereafter, the unfired composite film was allowed to pass between two rollers to press the unfired composite film. At the time, a roller pressing pressure was 3.0 kg/cm², a roller temperature was 80° C., and the movement speed of the unfired composite film was 0.5 m/min. The unfired composite film after pressing was subjected to thermal treatment (firing) at 320° C. for 15 minutes to complete imidization. Thus, a polyimide-fine particle composite film was obtained. The polyimide-fine particle composite film was immersed in a 10% by mass of HF solution for ten minutes to remove the fine particles contained in the film to obtain a porous polyimide film. Chemical etching was carried as in Example 1.

Example 5

The (double layer) unfired composite film was peeled off from the PET film, and then immersed in 500 g of solvent including water (mass ratio: N,N-dimethyl acetamide:water=10:90) for three minutes. Thereafter, the unfired composite film was allowed to pass between two rollers to press the unfired composite film. At the time, a roller pressing pressure was 3.0 kg/cm², a roller temperature was 80° C., and the movement speed of the unfired composite film was 0.5 m/min. The unfired composite film after pressing was subjected to thermal treatment (firing) at 320° C. for 15 minutes to complete imidization. Thus, a polyimide-fine particle composite film was obtained. The polyimide-fine particle composite film was immersed in a 10% by mass of HF solution for ten minutes to remove the fine particles contained in the film to obtain a porous polyimide film. Chemical etching was carried as in Example 1.

[Evaluation]

Film properties of the above obtained polyimide-fine particle composite film and porous polyimide film were evaluated. Results are shown in Table 1. In Table, the "single layer" shows results of the film properties of using an unfired composite film (single layer) obtained in "Formation of unfired composite film (single layer)" as a starting material. The "double layer" shows results of film properties of using a laminated film obtained in "Formation of unfired composite film (double layer)" as a starting material.

(Presence of Occurrence of Curling after Firing)

The resulting polyimide-fine particle composite film was observed by visual observation so as to evaluate presence of occurrence of curling after firing. The evaluation criteria are as follows.

OO: No occurrence of curling was observed at all.
O: End portion of film was partially curled.
X: End portion of film was entirely curled.

(Presence of Occurrence of Wrinkles (Unevenness, Undulation) after Firing)

The resulting polyimide-fine particle composite film was observed by visual observation so as to evaluate presence of occurrence of wrinkles (unevenness, undulation) after firing. The evaluation criteria are as follows.

OO: No wrinkles (unevenness, undulation) were observed at all.
O: Wrinkles (unevenness, undulation) were partially observed.
X: Wrinkles (unevenness, undulation) were observed as a whole.

(Air Permeability)

A porous polyimide film before chemical etching and a porous polyimide film after chemical etching were cut into 5-cm square of samples for measurement of air permeability. Time for 100 ml of air to pass through each of the samples was measured with a Gurley densometer (manufactured by Toyo Seiki Co., Ltd.) in accordance with JIS P 8117. In all examples, after chemical etching, the air permeability was improved. Values after chemical etching are shown in Table 1.

(Tensile Strength)

A tensile strength of a porous polyimide film after chemical etching was measured. That is to say, the porous polyimide film was cut into a 1 cm×5 cm strip-shaped sample.

Stress (MPa) of the sample at the time of breakage was measured by using RTC-1210A TENSILON (manufactured by ORIENTEC).

TABLE 1

| | Immersion into water/ solvent including water | Drying | Pressing | Curling after firing | Wrinkles after firing (unevenness, undulation) | Air permeability (seconds) After CE | Tensile strength (MPa) |
|---|---|---|---|---|---|---|---|
| Example 1 | Double layer | Carried out | Not carried out | Carried out | ○ | ○ | 59 | 12.5 |
| Example 2 | Double layer | Carried out | Air drying | Not carried out | ○ | ○ | 60 | 11.8 |
| Example 3 | Single layer | Carried out | Drying by heating with roller | Carried out | ○○ | ○○ | 42 | 14.4 |
| | Double layer | Carried out | Drying by heating with roller | Carried out | ○○ | ○○ | 58 | 13.4 |
| Comparative Example 1 | Double layer | Not carried out | Not carried out | Not carried out | x | x | 58 | 9.5 |
| Comparative Example 2 | Double layer | Not carried out | Not carried out | Carried out | x | x | 87 | 10.2 |
| Comparative Example 3 | Double layer | Not carried out | Air drying | Not carried out | x | x | 73 | 12.0 |
| Example 4 | Double layer | Carried out | Drying by heating with roller | Carried out | ○○ | ○○ | 40 | 12.6 |
| Example 5 | Double layer | Carried out | Drying by heating with roller | Carried out | ○○ | ○○ | 31 | 13.5 |

As is apparent from Table 1, in Examples, since the unfired composite film was immersed in water, occurrence of curling in the polyimide-fine particle composite film obtained by firing the unfired composite film was suppressed. On the contrary, in Comparative Examples, since the unfired composite film was not immersed in water, occurrence of curling in the polyimide-fine particle composite film obtained by firing of the unfired composite film was not suppressed.

As is apparent from comparison between Examples 1 to 2 and Example 3, it was demonstrated that generation of curling or wrinkles (unevenness or undulation) was easily suppressed in a polyimide-fine particle composite film obtained by firing the unfired composite film when the unfired composite film was immersed in water and then dried by heating as compared with the case where drying was not carried out or air-drying was carried out. In comparison between Example 1 and Example 2, wrinkles (unevenness or undulation) in the polyimide-fine particle composite film obtained by firing of the unfired composite film were partially generated, but they were suppressed in Example 1 in which the unfired composite film was pressed, and the values of the air permeability or the tensile strength were also excellent.

As is apparent from the comparison between Example 3 and Examples 4 to 5, when water-soluble organic solvent was mixed into water as the solvent including water, it was demonstrated that the air permeability of the porous polyimide film was improved.

The invention claimed is:

1. A method for producing a porous polyimide film, the method comprising, in the following order:
applying a varnish onto a surface of a support, the varnish comprising a resin including polyamide acid and/or polyimide, fine particles, and a first solvent;
drying the varnish thus applied to form an unfired composite film;
peeling the unfired composite film off from the support;
immersing the unfired composite film into a second solvent including water;
firing the unfired composite film to obtain a polyimide-fine particle composite film; and
removing the fine particles from the polyimide-fine particle composite film.

2. The method according to claim 1, further comprising, between the immersing and the firing, pressing the unfired composite film after the immersing.

3. The method according to claim 1, further comprising, between the immersing and the firing, drying the unfired composite film after the immersing.

4. The method according to claim 1, wherein said drying the varnish thus applied is carried out under atmosphere or vacuum conditions at a temperature from 1° C. to 100° C.

5. The method according to claim 1, wherein the unfired composite film formed by said drying contains a residual amount of the first solvent before immersing it into the second solvent, and wherein said immersing the unfired composite film into the second solvent including water is to reduce the residual amount of the first solvent from the unfired composite film.

6. The method according to claim 1, wherein the first solvent is at least one member selected from the group consisting of nitrogen-containing polar solvents, lactone polar solvents, dimethyl sulfoxide, acetonitrile, fatty acid esters, ethers, and phenol solvents, and wherein the second solvent including water is a solvent including not less than 50% by mass of water.

7. The method according to claim 1, wherein said immersing the unfired composite film into the second solvent including water is carried out at a temperature from 5° C. to 60° C.

8. The method according to claim 1, wherein the surface of the support is one of a surface of a substrate or a surface of a lower film that is formed on the substrate and is different from the unfired composite film.

9. The method according to claim 8, wherein the lower film is another unfired composite film formed by applying another varnish comprising a resin including polyamide acid and/or polyimide, fine particles, and a solvent, and drying the another varnish thus applied.

* * * * *